United States Patent
Kameyama

(10) Patent No.: US 7,251,105 B2
(45) Date of Patent: Jul. 31, 2007

(54) NEGATIVE PRESSURE TYPE HEAD SLIDER AND DISK DRIVE

(75) Inventor: Masaki Kameyama, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 11/209,968

(22) Filed: Aug. 23, 2005

(65) Prior Publication Data

US 2005/0280942 A1    Dec. 22, 2005

Related U.S. Application Data

(60) Division of application No. 10/235,870, filed on Sep. 5, 2002, now Pat. No. 6,950,281, which is a continuation of application No. PCT/JP00/01529, filed on Mar. 14, 2000.

(51) Int. Cl.
   *G11B 5/60* (2006.01)
(52) U.S. Cl. .................................................. 360/235
(58) Field of Classification Search ............ 360/235.4, 360/235.6, 236.1, 236.2, 236.3, 236.8, 237, 360/235
See application file for complete search history.

(56) References Cited

U.S. PATENT DOCUMENTS

| | | | |
|---|---|---|---|
| 4,636,894 A * | 1/1987 | Mo .......................... | 360/236.3 |
| 5,134,531 A | 7/1992 | Matsuzaki et al. ........ | 360/235.4 |
| 5,606,476 A | 2/1997 | Chang et al. ............. | 360/236.8 |
| 5,708,540 A | 1/1998 | Ananth et al. | |
| 5,777,825 A | 7/1998 | Dorius | |
| 5,973,881 A | 10/1999 | Ajiki ....................... | 360/235.8 |
| 6,055,129 A | 4/2000 | Park et al. | |
| 6,072,663 A * | 6/2000 | Yokohata et al. ......... | 360/235.8 |
| 6,115,219 A | 9/2000 | Hall ........................ | 360/234.2 |
| 6,144,528 A * | 11/2000 | Anaya-Dufresne et al. ...... | 360/235.4 |

(Continued)

FOREIGN PATENT DOCUMENTS

JP    62-248179    10/1987

(Continued)

OTHER PUBLICATIONS

Web report "Fluid Dynamics" from www.efm.leeds.sc.uk download on May 18, 2006.*

*Primary Examiner*—Tianjie Chen
(74) *Attorney, Agent, or Firm*—Greer, Burns & Crain, Ltd.

(57) ABSTRACT

A disk drive including a negative pressure type head slider having a transducer for reading/writing data from/to a disk having a plurality of tracks, and an actuator for moving the head slider across the tracks of the disk. The actuator includes an actuator arm rotatably mounted on a base of the head slider, a suspension fixed at a base end portion thereof to a front end portion of the actuator arm, and the head slider mounted on a front end portion of the suspension. The head slider includes a front pad having a raised surface and a step surface lower in level than the raised surface, the transducer formed near the air outlet end, and a first groove for generating a negative pressure by expanding air once compressed at the front pad. The bottom surface of the first groove is formed with a plurality of second grooves continuously extending from the downstream side of the front pad to the air outlet end. The second grooves are spaced from each other in the transverse direction of the head slider.

6 Claims, 13 Drawing Sheets

U.S. PATENT DOCUMENTS

| | | | |
|---|---|---|---|
| 6,181,518 B1 * | 1/2001 | Harris et al. | 360/236.6 |
| 6,288,874 B1 * | 9/2001 | Ito | 360/235.5 |
| 6,449,126 B1 * | 9/2002 | Dorius et al. | 360/236.3 |
| 6,628,480 B2 | 9/2003 | Kohira et al. | |
| 6,950,281 B2 * | 9/2005 | Kameyama | 360/235 |
| 2002/0075599 A1 | 6/2002 | Rao et al. | |
| 2002/0075601 A1 | 6/2002 | Koishi | |
| 2002/0191339 A1 | 12/2002 | Tokisue et al. | |

FOREIGN PATENT DOCUMENTS

| | | |
|---|---|---|
| JP | 63-102071 | 7/1988 |
| JP | 05159214 A | 6/1993 |
| JP | 11-273048 | 10/1999 |
| JP | 2000-021111 | 1/2000 |

* cited by examiner

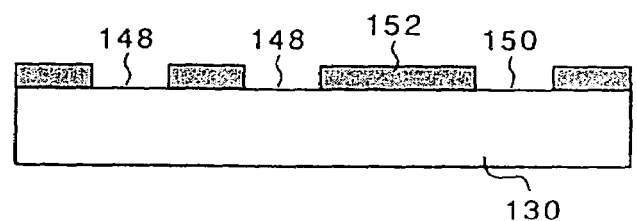
F I G. 17A
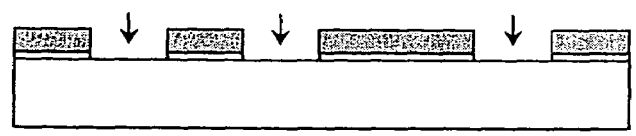
F I G. 17B
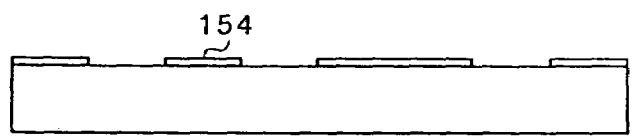
F I G. 17C
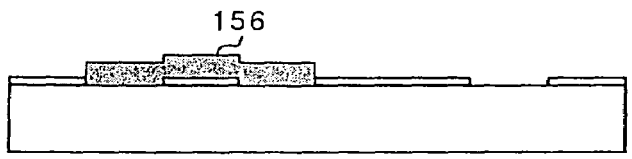
F I G. 17D
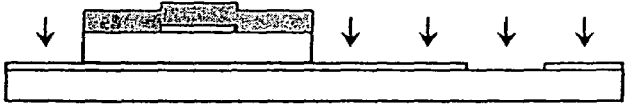
F I G. 17E
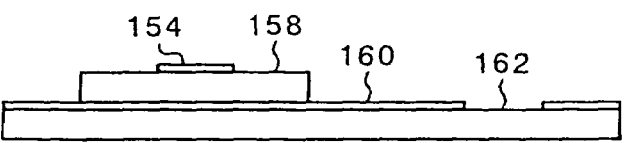
F I G. 17F F I G. 18A 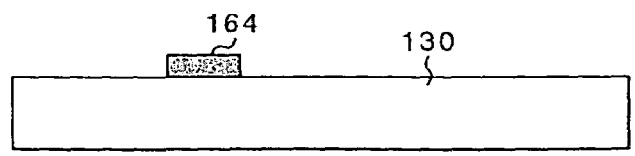
F I G. 18B 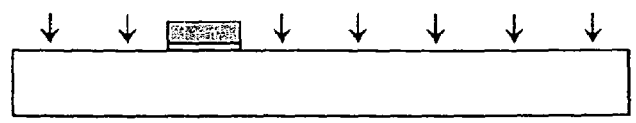
F I G. 18C 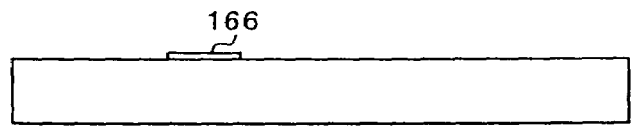
F I G. 18D 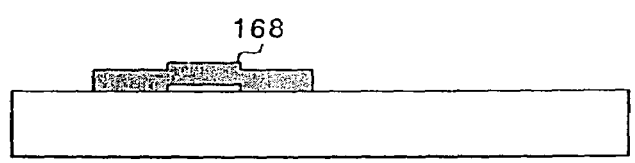
F I G. 18E 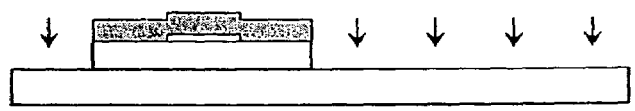
F I G. 18F 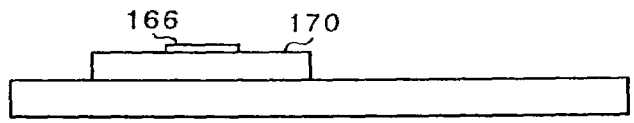
F I G. 18G 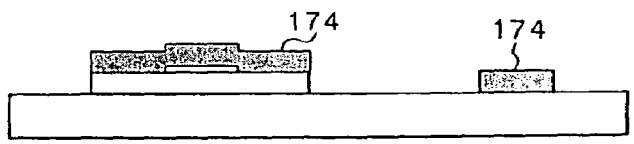
F I G. 18H 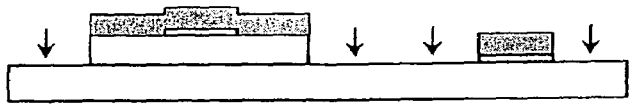
F I G. 18I 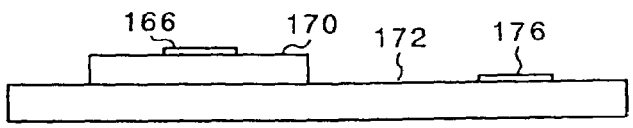

NEGATIVE PRESSURE TYPE HEAD SLIDER AND DISK DRIVE

This is a divisional of U.S. patent application Ser. No. 10/235,870, filed Sep. 5, 2002, now U.S. Pat. No. 6,950,281, which is a continuation of International PCT Application No. PCT/JP00/01529 filed Mar. 14, 2000, which was not published in English.

BACKGROUND OF THE INVENTION

1. Field of the Invention

The present invention relates generally to a magnetic disk drive, and more particularly to a negative pressure type head slider for a magnetic disk drive.

2. Description of the Related Art

In recent magnetic disk drives with decreasing size and increasing storage capacity, it has been desired to reduce the flying height of a head slider and realize contact recording/reproduction such that the head slider flies a microscopic height from a recording medium such as a magnetic disk or comes into contact with the recording medium. To reduce the flying height of the head slider, the surface roughness of the surface of the magnetic disk must be reduced. In a contact start and stop (CSS) type magnetic disk drive heretofore widely used, a flying surface of a magnetic head slider comes into contact with a magnetic disk upon stoppage of rotation of the magnetic disk, and flies above the surface of the magnetic disk during rotation of the magnetic disk by the action of an air flow produced in concert with the rotation of the magnetic disk.

In the CSS type magnetic disk drive, high flying stability and microscopic flying height (on the order of submicrons) can be ensured. However, the air bearing surface (flying surface) of the head slider comes into contact with the magnetic disk upon stoppage of rotation of the magnetic disk, and slides relative to the magnetic disk at starting and stopping the disk drive. To cope with this, a protective film formed of a hard material such as carbon and a lubricating layer for reducing the friction and wearing of the protective film to improve the durability of the magnetic disk are formed on a recording layer of the magnetic disk. Although the friction and wearing of the protective film can be reduced by the presence of the lubricating layer, there is a possibility of stiction between the magnetic disk and the head slider in the rest condition of the magnetic disk, causing a problem that the disk drive cannot be started.

With a recent increase in amount of information, the recording density or storage capacity of the magnetic disk drive is remarkably increasing and the size of the magnetic disk drive is remarkably decreasing. The size reduction of the magnetic disk drive is accompanied by a decrease in torque of a spindle motor in the disk drive, and the disk surface of the magnetic disk is smoothened for the increasing recording density. Due to these factors, much attention is now focused on the stiction problem causing a defective operation. As measures against this stiction problem, it has been proposed to apply texture forming by laser to a CSS zone of the magnetic disk or provide a plurality of projections on the flying surface (air bearing surface) of the head slider, thereby reducing a contact area between the head slider and the disk surface.

A negative pressure type magnetic head slider is widely used in recent magnetic disk drives, so as to reduce the flying height of the magnetic head slider from the magnetic disk. Such a negative pressure type magnetic head slider has a groove for generating a negative pressure by expanding air once compressed near an air inlet end of the head slider. In the magnetic disk drive using the negative pressure type magnetic head slider, there is a possibility that dust or dirt may be deposited on the bottom surface of the groove of the head slider in the CSS operation or seek operation, and when the amount of dust or dirt deposited exceeds a permissible amount, it may fall onto the disk surface to cause head crash.

SUMMARY OF THE INVENTION

It is therefore an object of the present invention to provide a disk drive which can suppress the deposition of dust or dirt possibly existing inside the disk drive onto the bottom surface of the groove of a negative pressure type head slider, thereby effectively preventing head crash due to falling of the dust or dirt onto the disk surface.

In accordance with an aspect of the present invention, there is provided a disk drive comprising a housing having a base; a disk rotatably mounted in the housing and having a plurality of tracks; a negative pressure type head slider having a transducer for reading/writing data from/to the disk, a disk opposing surface, an air inlet end, and an air outlet end; and an actuator for moving the head slider across the tracks of the disk; the actuator comprising an actuator arm rotatably mounted on the base; a suspension fixed at a base end portion thereof to a front end portion of the actuator arm; and the head slider mounted on a front end portion of the suspension; the head slider comprising a front pad formed on the disk opposing surface at a position near the air inlet end, the front pad having a raised surface and a step surface lower in level than the raised surface; the transducer formed near the air outlet end; a first groove for generating a negative pressure by expanding air once compressed at the front pad; and a plurality of second grooves formed on the bottom surface of the first groove so as to continuously extend from the downstream side of the front pad to the air outlet end, the second grooves being spaced from each other in the transverse direction of the head slider.

Preferably, the second grooves extend along air streamlines in the CSS zone. As a modification, the second grooves may extend substantially parallel to an air inlet direction in the CSS zone. As another modification, the angle of extension of the second grooves with respect to the longitudinal direction of the head slider may be continuously changed so that the direction of extension of the innermost second groove is substantially parallel to an air inlet direction in the innermost track condition and the direction of extension of the outermost second groove is substantially parallel to an air inlet direction in the outermost track condition.

In accordance with another aspect of the present invention, there is provided a disk drive comprising a housing having a base; a disk rotatably mounted in the housing and having a plurality of tracks; a negative pressure type head slider having a transducer for reading/writing data from/to the disk, a disk opposing surface, an air inlet end, and an air outlet end; and an actuator for moving the head slider across the tracks of the disk; the actuator comprising an actuator arm rotatably mounted on the base; a suspension fixed at a base end portion thereof to a front end portion of the actuator arm; and the head slider mounted on a front end portion of the suspension; the head slider comprising a front pad formed on the disk opposing surface at a position near the air inlet end, the front pad having a raised surface and a step surface lower in level than the raised surface; the transducer formed near the air outlet end; a groove for generating a negative pressure by expanding air once compressed at the front pad; and a plurality of rails formed on the bottom surface of the groove so as to continuously extend from the downstream side of the front pad to the air outlet end, the rails being spaced from each other in the transverse direction of the head slider.

In accordance with a further aspect of the present invention, there is provided a disk drive comprising a housing having a base; a disk rotatably mounted in the housing and having a plurality of tracks; a negative pressure type head slider having a transducer for reading/writing data from/to the disk, a disk opposing surface, an air inlet end, and an air outlet end; and an actuator for moving the head slider across the tracks of the disk; the actuator comprising an actuator arm rotatably mounted on the base; a suspension fixed at a base end portion thereof to a front end portion of the actuator arm; and the head slider mounted on a front end portion of the suspension; the head slider comprising a pair of rails formed on the disk opposing surface, each of the rails having a flat air bearing surface for generating a flying force during rotation of the disk; the transducer formed near the air outlet end at a position where one of the rails is formed; a first groove defined between the rails for generating a negative pressure by expanding air once compressed near the air inlet end; and a plurality of second grooves formed on the bottom surface of the first groove so as to continuously extend from near the air inlet end to the air outlet end, the second grooves being spaced from each other in the transverse direction of the head slider.

In accordance with a still further aspect of the present invention, there is provided a disk drive comprising a housing having a base; a disk rotatably mounted in the housing and having a plurality of tracks; a negative pressure type head slider having a transducer for reading/writing data from/to the disk, a disk opposing surface, an air inlet end, and an air outlet end; and an actuator for moving the head slider across the tracks of the disk; the actuator comprising an actuator arm rotatably mounted on the base; a suspension fixed at a base end portion thereof to a front end portion of the actuator arm; and the head slider mounted on a front end portion of the suspension; the head slider comprising a pair of first rails formed on the disk opposing surface, each of the first rails having a flat air bearing surface for generating a flying force during rotation of the disk; the transducer formed near the air outlet end at a position where one of the first rails is formed; a groove defined between the first rails for generating a negative pressure by expanding air once compressed near the air inlet end; and a plurality of second rails formed on the bottom surface of the groove so as to continuously extend from near the air inlet end to the air outlet end, the rails being spaced from each other in the transverse direction of the head slider.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 17A to 17F are schematic views showing another manufacturing method for the head slider according to the first preferred embodiment;

FIGS. 18A to 18I are schematic views showing a manufacturing method for the head slider according to the second preferred embodiment.

DETAILED DESCRIPTION OF THE PREFERRED EMBODIMENTS

Figure 1:
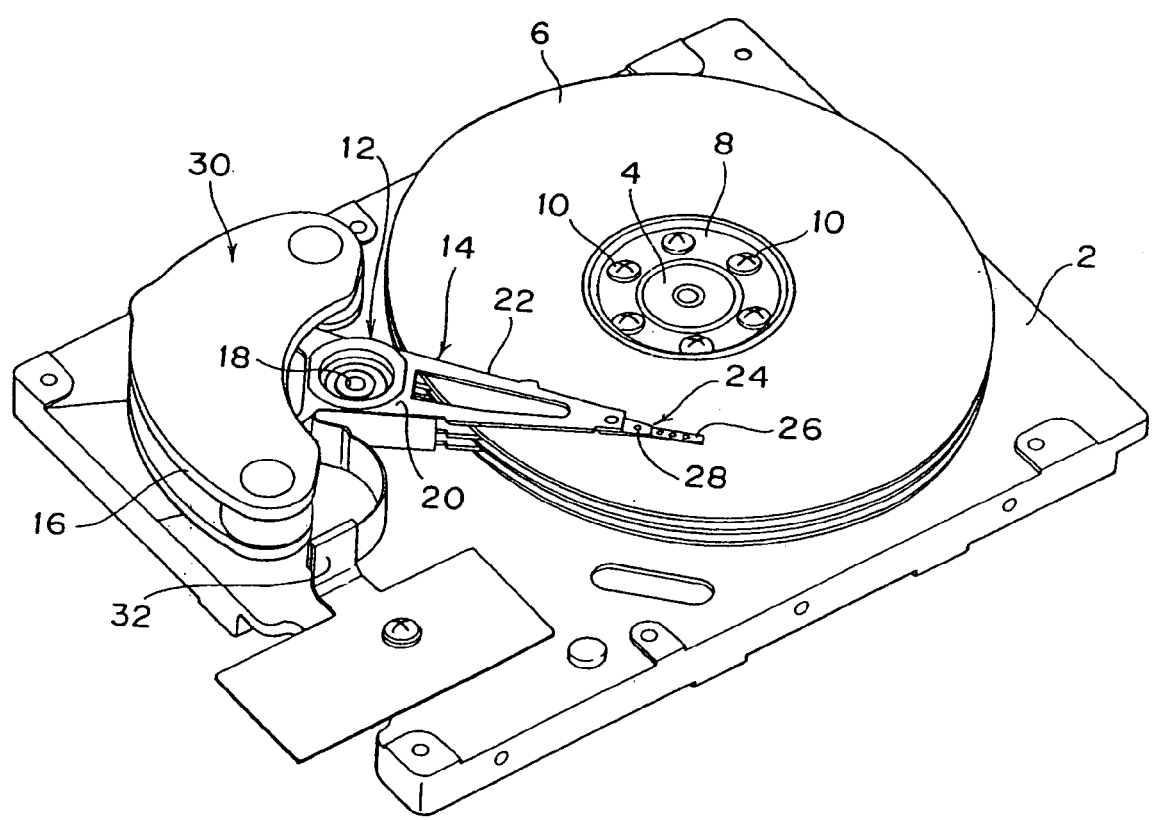
FIG. 1 is a perspective view of a magnetic disk drive with a cover removed.

Some preferred embodiments of the present invention will now be described with reference to the drawings. Throughout the drawings, substantially the same parts are denoted by the same reference numerals. Referring to FIG. 1, there is shown a perspective view of a magnetic disk drive according to a first preferred embodiment of the present invention in the condition where a cover is removed. A shaft 4 is fixed to a base 2, and a spindle hub (not shown) is rotatably mounted on the shaft 4. The spindle hub is driven by a DC motor (not shown) to rotate about the shaft 4. A plurality of magnetic disks 6 and spacers (not shown) are mounted on the spindle hub so as to be alternately stacked. That is, the plural magnetic disks 6 are fixedly mounted on the spindle hub by securing a disk clamp 8 to the spindle hub by means of a plurality of screws 10, and are equally spaced a given distance by the spacers.

Reference numeral 12 denotes a rotary actuator consisting of an actuator arm assembly 14 and a magnetic circuit 16. The actuator arm assembly 14 is rotatable about a shaft 18 fixed to the base 2. The actuator arm assembly 14 includes an actuator block 20 rotatably mounted on the shaft 18 through a pair of bearings (not shown), a plurality of actuator arms 22 extending horizontally from the actuator block 20 in one direction, and a head assembly 24 fixed to a front end portion of each actuator arm 22.

Each head assembly 24 includes a negative pressure type head slider 26 having an electromagnetic transducer (magnetic head element) for reading/writing data from/to the corresponding magnetic disk 6, and a load beam (suspension) 28 having a front end portion supporting the head slider 26 and a base end portion fixed to the corresponding actuator arm 22. A coil (not shown) is supported on the opposite side of the actuator arms 22 with respect to the shaft 18. The coil is inserted in a gap of the magnetic circuit 16. The magnetic circuit 16 and the coil constitute a voice coil motor (VCM) 30. Reference numeral 32 denotes a flexible printed circuit board (FPC) for supplying a write signal to the electromagnetic transducer and for taking a read signal from the electromagnetic transducer. One end of the flexible printed circuit board 32 is fixed to a side surface of the actuator block 20.

Figure 2A:
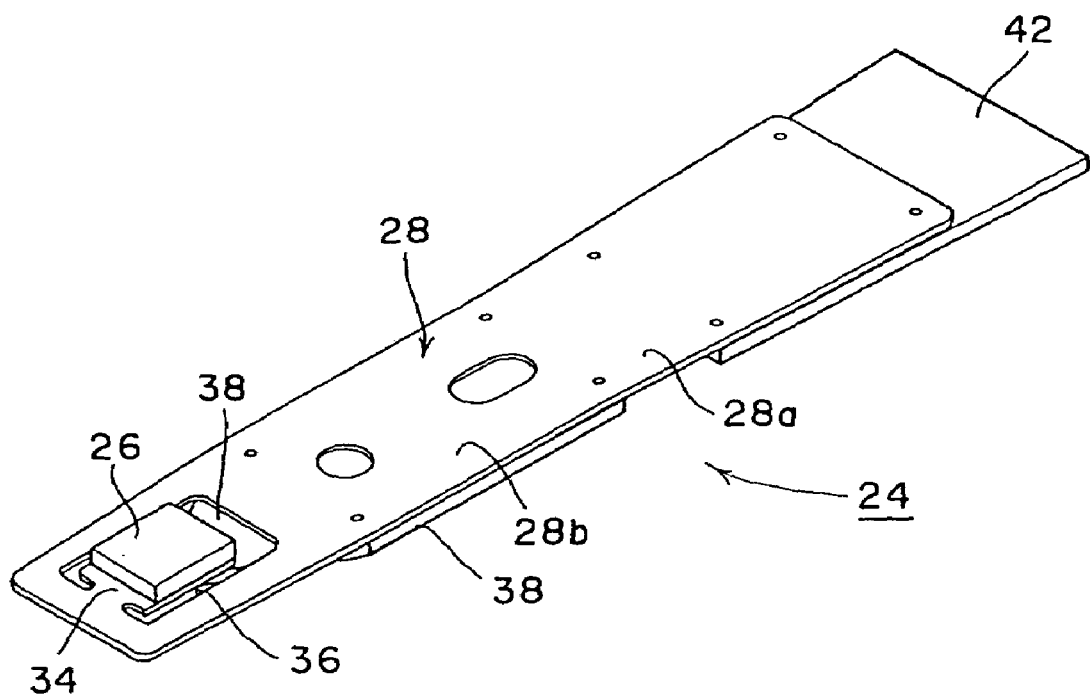
FIG. 2A is a perspective view of a head assembly.
Figure 2B:
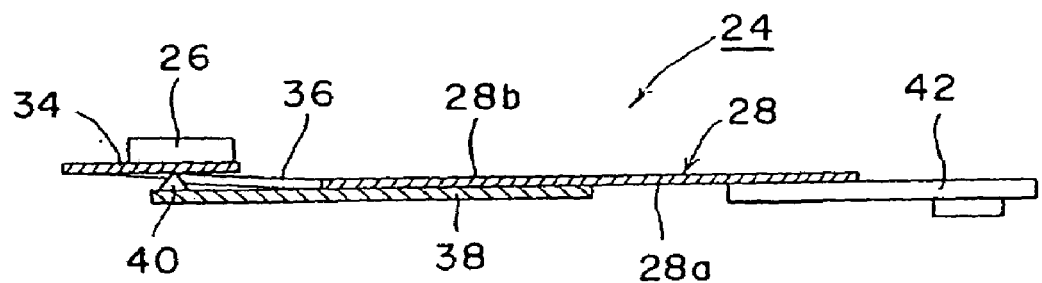
FIG. 2B is a longitudinal sectional view of the head assembly.
Figure 3:
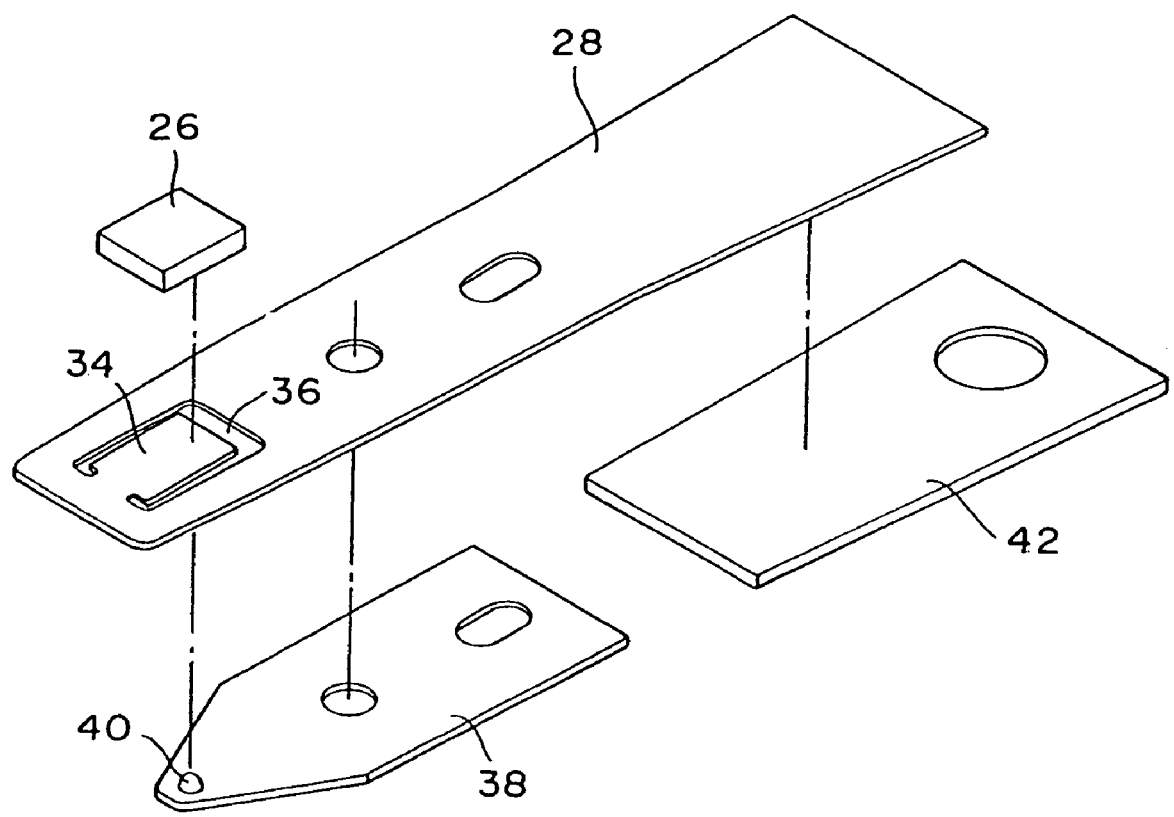
FIG. 3 is an exploded perspective view of the head assembly.

FIG. 2A is a perspective view of the head assembly 24, FIG. 2B is a longitudinal sectional view of the head assembly 24, and FIG. 3 is an exploded perspective view of the head assembly 24. As best shown in FIG. 3, the load beam 28 is integrally formed with a gimbal 34. The gimbal 34 is defined by forming a U-shaped slit 36 at a front end portion of the load beam 28. The load beam 28 is formed of stainless steel, and it has a thickness of about 22 µm. The load beam 28 includes a spring portion 28a for pressing the head slider 26 on the corresponding disk 6 and a rigid portion 28b. A reinforcing plate 38 is fixed to the back surface of the rigid portion 28b by spot welding or the like.

The reinforcing plate 38 is formed of stainless steel, for example, and it has a thickness about 1.0 times to about 2.0 times, preferably, about 1.3 times to about 1.5 times the thickness of the load beam 28. By setting the thickness of the reinforcing plate 38 in the above-mentioned range, the resonance frequency of the head assembly 24 can be increased and its mass increase can be minimized. If the thickness of the reinforcing plate 38 is set less than a value 1 times the thickness of the load beam 28, the rigidity of the rigid portion 28b decreases to cause a reduction in the resonance point. Conversely, if the thickness of the reinforcing plate 38 is set greater than a value 2 times the thickness of the load beam 28, the mass of the head assembly 24 is increased to cause a reduction in impact acceleration upon separation of the head slider 26 from the disk 6, causing a deterioration in shock resistance.

While the load beam 28 is a platelike member, the spring portion 28a is bent round so as to press the head slider 26 on the corresponding disk 6 in actual use. The reinforcing plate 38 is formed at its front end portion with a pivot 40 having a tip kept in contact with the back surface of the gimbal 34 to support the head slider 26. Further, a spacer 42 formed of aluminum is fixed by spot welding to a base end portion of the load beam 28.

In the head assembly 24, the gimbal 34 is set so that the flexural rigidity of a front portion of the gimbal 34 with respect to the pivot 40 is equal to that of a rear portion of the gimbal 34. Accordingly, although the gimbal 34 is pushed from its back side by the pivot 40, the head slider 26 is not tilted. As a result, the head slider 26 can be loaded without applying a moment, thereby realizing a stable flying attitude of the head slider 26. Further, since the head slider 26 is preloaded by the pivot 40, the friction at the pivot 40 upon loading on the head slider 26 becomes large by the preload, so that the limit to the slip at the pivot 40 can be maintained to be high even when the biasing force of the spring portion 28a for pressing the head slider 26 on the disk 6 is small.

Figure 4:
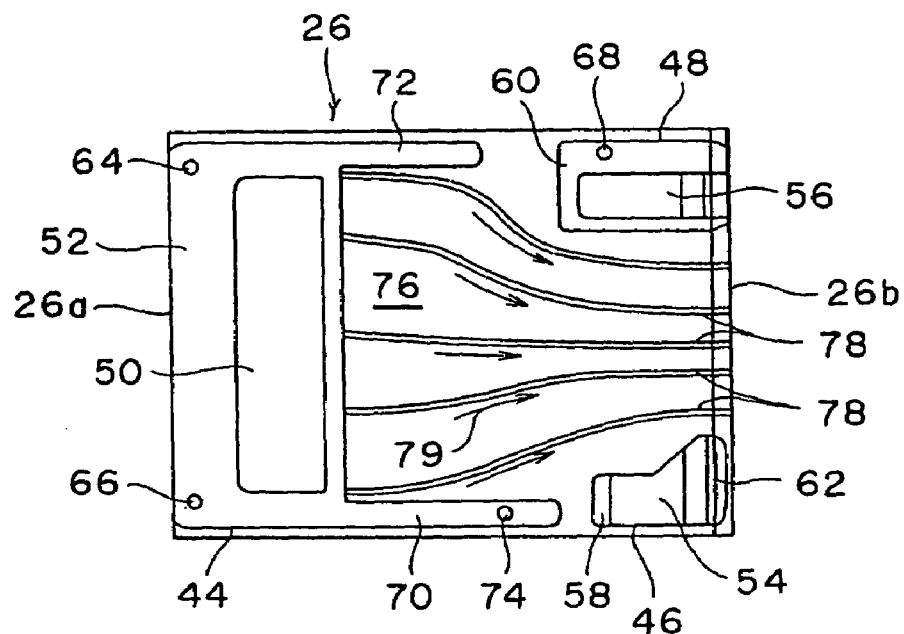
FIG. 4 is a plan view of a negative pressure type head slider according to a first preferred embodiment of the present invention.
Figure 5:
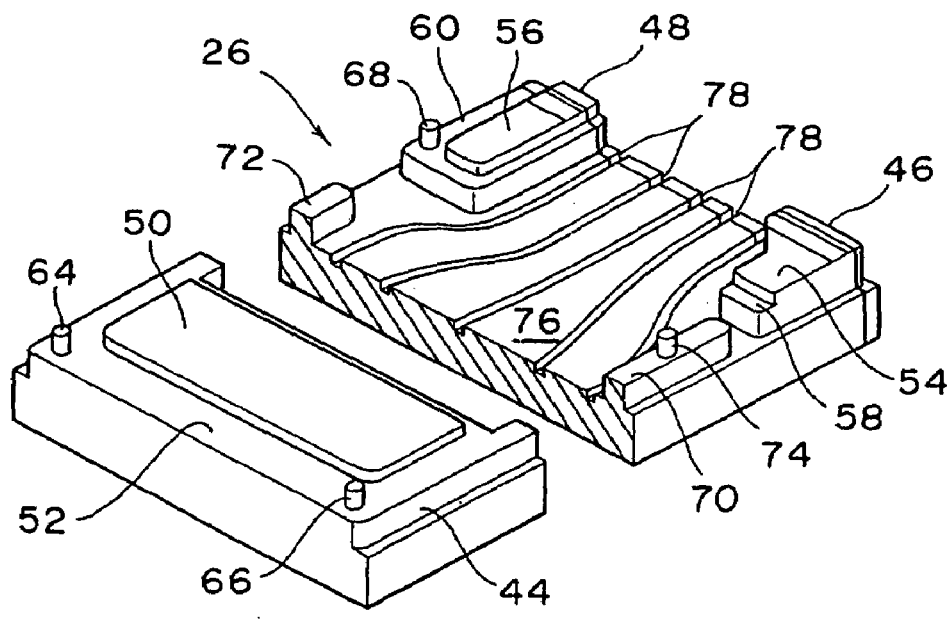
FIG. 5 is a partially cutaway perspective view of the head slider shown in FIG. 4.

Referring to FIG. 4, there is shown a plan view of the negative pressure type head slider 26 according to the first preferred embodiment of the present invention. FIG. 5 is a partially cutaway perspective view of the head slider 26 shown in FIG. 4. The head slider 26 is in the form of rectangular parallelepiped, and has an air inlet end 26a and an air outlet end 26b. The upper surface of the head slider 26 as viewed in FIGS. 4 and 5 is a disk opposing surface adapted to face the corresponding disk 6. A front pad 44 is formed on the disk opposing surface of the head slider 26 at a position adjacent to the air inlet end 26a, and a pair of rear pads 46 and 48 are formed on the disk opposing surface of the head slider 26 at positions adjacent to the air outlet end 26b and transversely spaced from each other. The front pad 44 is formed with a raised surface (air bearing surface) 50 extending in the transverse direction of the head slider 26 and a step surface 52 lower in level than the raised surface 50.

Similarly, the rear pads 46 and 48 are formed with raised surfaces (air bearing surfaces) 54 and 56 and step surfaces 58 and 60 lower in level than the raised surfaces 54 and 56, respectively. The raised surface 54 is smaller in area than the raised surface 56. Accordingly, a flying force applied to the raised surface 56 is larger than that applied to the raised surface 54 in the head slider 26. An electromagnetic transducer 62 is formed near the air outlet end of the rear pad 46, and the distance between the head slider 26 and the disk surface during rotation of the disk 6 is minimum near the electromagnetic transducer 62.

When the disk 6 is rotated to generate an air flow along the disk surface, the air flow acts on the raised surfaces 50, 54, and 56. As a result, flying forces for flying the head slider 26 above the disk surface are generated on the raised surfaces 50, 54, and 56. In the head slider 26, the area of the raised surface 50 is relatively large, so that a relatively large flying force is generated on the raised surface 50 during rotation of the disk 6. As a result, the head slider 26 is maintained in an inclined attitude at a pitch angle a such that the air inlet end 26a is tilted up.

A pair of projections 64 and 66 for preventing the stiction of the head slider 26 upon CSS are formed on the step surface 52 of the front pad 44. Similarly, a projection 68 is formed on the step surface 60 of the rear pad 48. A pair of side pads 70 and 72 extend from the transverse ends of the front pad 44 toward the rear pads 46 and 48, respectively. The side pad 70 is also formed with a projection 74 for prevention of the stiction.

A first groove 76 for generating a negative pressure is defined between the side pads 70 and 72 on the downstream side of the front pad 44. The first groove 76 extends from a position upstream of the longitudinal center of the head slider 26 to the air outlet end 26b. Accordingly, when passing the raised surface 50 of the front pad 44, the air flow is expanded in the first groove 76 in a direction perpendicular to the disk surface, thereby generating a negative pressure in the first groove 76. This negative pressure comes into balance with the above-mentioned flying forces applied to the raised surfaces 50, 54, and 56, thereby defining a flying height of the head slider 26.

A plurality of narrow second grooves 78 are formed on the bottom surface of the first groove 76 so as to continuously extend from the downstream side of the front pad 44 to the air outlet end 26b. The second grooves 78 are spaced from each other in the transverse direction of the head slider 26. The second grooves 78 extend along different streamlines 79 of air generated on the bottom surface of the first groove 76. Preferably, the second grooves 78 extend along such air streamlines generated on the bottom surface of the first groove 76 in the CSS zone. By forming these narrow grooves 78 on the bottom surface of the first groove 76, dust or dirt deposited on the bottom surface of the first groove 76 during the entry of air into the first groove 76 can be guided along the second grooves 78 to the air outlet end 26b, thereby suppressing the accumulation of the dust or dirt on the bottom surface of the first groove 76. Accordingly, the dust or dirt deposited on the bottom surface of the first groove 76 can be prevented from falling down onto the disk 6, thereby preventing head crash due to the dust or dirt. Preferably, each second groove 78 has a depth of 2 μm or less and a width of 10 to 20 μm.

Further, a porous polymer layer of polyurethane or the like may be bonded to the air outlet end 26b, so as to absorb the dust or dirt guided to the air outlet end 26b and thereby prevent scattering of the dust or dirt into the internal space of the disk drive. Preferably, water-repellent treatment is applied to each second groove 78. For example, this water-repellent treatment may be effected by mixing a fluorine-containing gas such as $CF_4$ into an etching gas mainly containing Ar in forming the second grooves 78 by ion beam etching.

Figure 6:
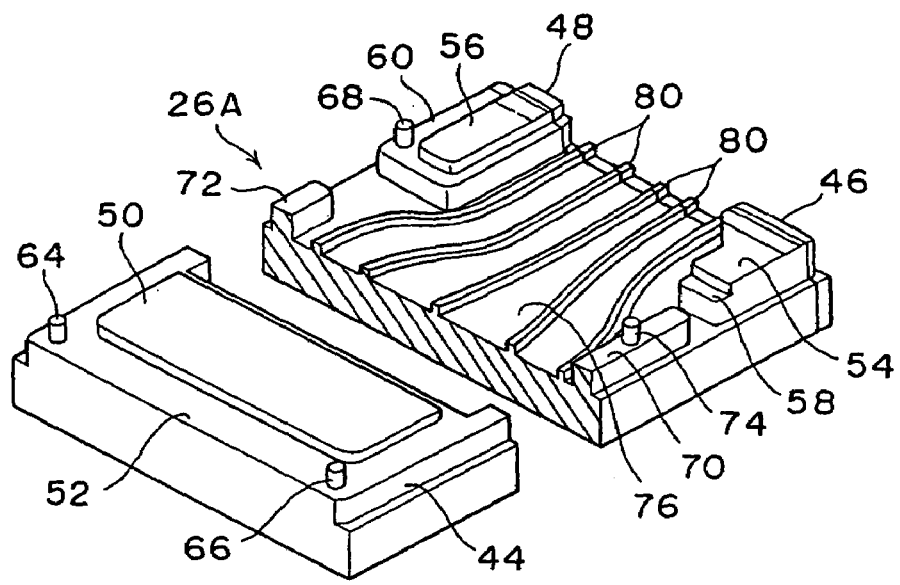
FIG. 6 is a partially cutaway perspective view of a negative pressure type head slider according to a second preferred embodiment of the present invention.

Referring to FIG. 6, there is shown a partially cutaway perspective view of a negative pressure type head slider 26A according to a second preferred embodiment of the present invention. The head slider 26A according to the second preferred embodiment has a plurality of rails 80 in place of the second grooves 78 formed in the first groove 76 of the head slider 26 according to the first preferred embodiment. The other configuration of the second preferred embodiment is similar to that of the first preferred embodiment. Preferably, each rail 80 has a height of 0.4 μm or less and a width of 10 to 20 μm.

The plural rails 80 are formed along the air streamlines generated on the bottom surface of the groove 76 in the CSS zone. The plural rails 80 extend continuously from the downstream side of the front pad 44 to the air outlet end 26b, and they are spaced from each other in the transverse direction of the head slider 26A. With this configuration, dust or dirt deposited on the bottom surface of the groove 76 during the entry of air into the groove 76 can be guided along the rails 80 to the air outlet end 26b, thereby preventing the accumulation of the dust or dirt on the bottom surface of the groove 76.

Figure 7:
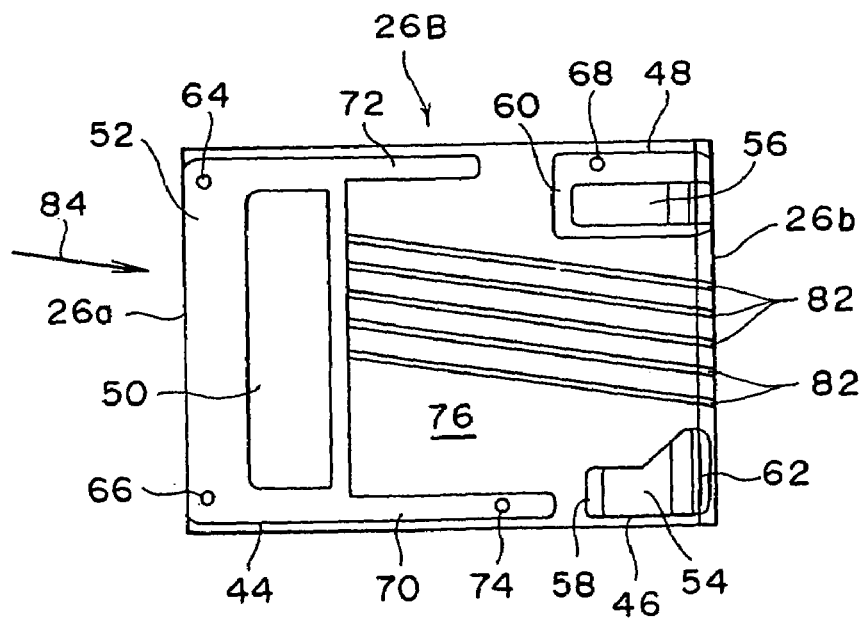
FIG. 7 is a plan view of a negative pressure type head slider according to a third preferred embodiment of the present invention.

Referring to FIG. 7, there is shown a plan view of a negative pressure type head slider 26B according to a third preferred embodiment of the present invention. The head slider 26B according to the third preferred embodiment has a plurality of second grooves 82 extending in a direction substantially parallel to an air inlet direction shown by arrow 84 in the CSS zone. The second grooves 82 are formed on the bottom surface of the first groove 76. In the CSS zone, the head slider 26B comes into contact with the disk 6, and dust or dirt is therefore prone to deposit on the bottom surface of the groove 76. In consideration of this fact, the second grooves 82 are formed on the bottom surface of the first groove 76 so as to extend in a direction substantially parallel to the air inlet direction 84 in the CSS zone, so that the dust or dirt deposited on the bottom surface of the first groove 76 in the CSS zone can be positively guided along the second grooves 82 to the air outlet end 26b. The other configuration of this preferred embodiment is similar to that of the first preferred embodiment. In modification, a plurality of rails as shown in FIG. 6 may be formed in place of the plural second grooves 82.

Figure 8:
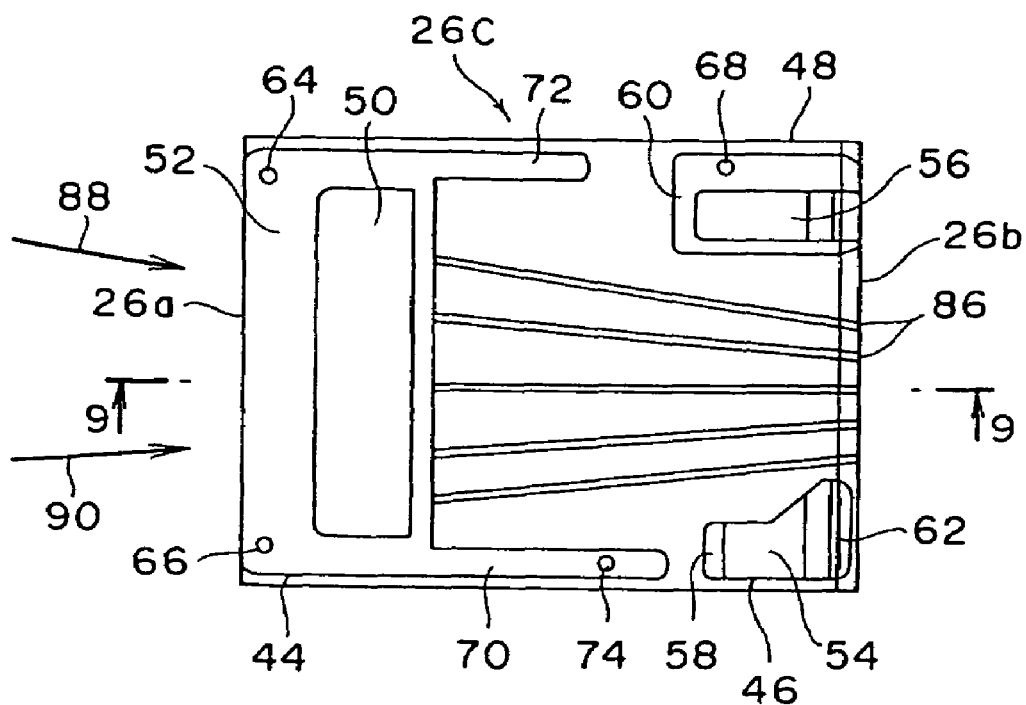
FIG. 8 is a plan view of a negative pressure type head slider according to a fourth preferred embodiment of the present invention.
Figure 9:
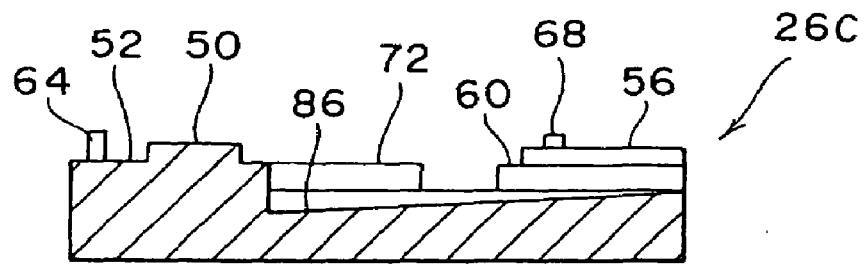
FIG. 9 is a cross section taken along the line 9—9 in FIG. 8.

Referring to FIG. 8, there is shown a plan view of a negative pressure type head slider 26C according to a fourth preferred embodiment of the present invention. FIG. 9 is a cross section taken along the line 9—9 in FIG. 8. The head slider 26C according to the fourth preferred embodiment has a plurality of second grooves 86 extending in different directions in the first groove 76. That is, the angle of extension of the second grooves 86 with respect to the longitudinal direction of the head slider 26C is continuously changed in such a manner that the direction of extension of the innermost groove 86 is substantially parallel to an air inlet direction shown by arrow 88 in the innermost track condition and the direction of extension of the outermost groove 86 is substantially parallel to an air inlet direction shown by arrow 90 in the outermost track condition. Furthermore, as shown in FIG. 9, the depth of each second groove 86 is continuously decreased from the air inlet side to the air outlet end 26b. Alternatively, the depth of each second groove 86 may be stepwise decreased toward the air outlet end 26b.

Thus, the angle of extension of the second grooves 86 is continuously changed in this preferred embodiment, so that any one of the grooves 86 becomes substantially parallel to any air inlet direction over the seek range of the head slider 26C. Accordingly, dust or dirt deposited on the bottom surface of the groove 76 can be effectively guided along the groove 86 to the air outlet end 26b. Further, the reason why the depth of each second groove 86 is set largest at its upstream end is that the negative pressure generated in the groove 76 is largest at a position just downstream of the front pad 44 and it is therefore expected that the deposition of dust or dirt becomes maximum at this position. Accordingly, by setting the depth of each second groove 86 as mentioned above, the dust or dirt deposited can be positively removed. Also in the first and third preferred embodiments, the depths of the second grooves 78 and 82 may be changed as in the head slider 26C according to the fourth preferred embodiment shown in FIG. 9.

Figure 10:
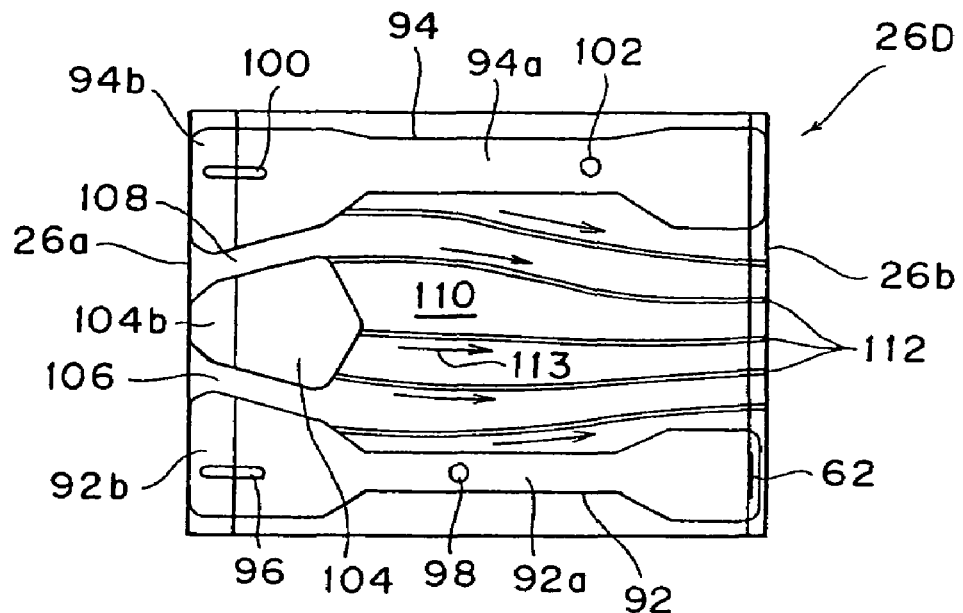
FIG. 10 is a plan view of a negative pressure type head slider according to a fifth preferred embodiment of the present invention.
Figure 11:
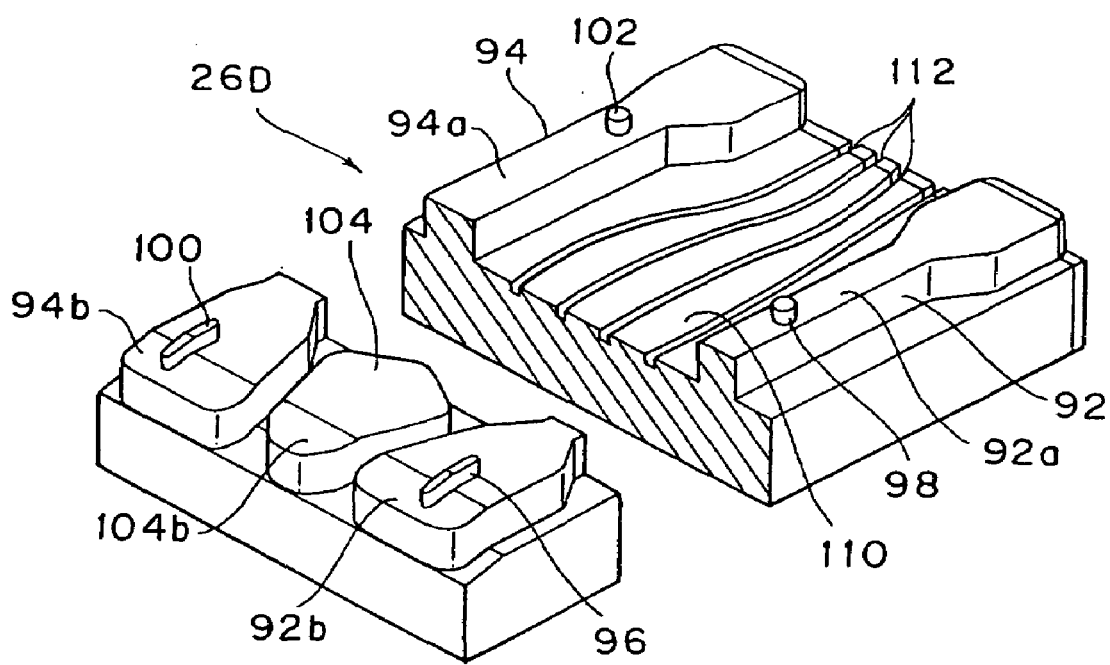
FIG. 11 is a partially cutaway perspective view of the head slider shown in FIG. 10.

Referring to FIG. 10, there is shown a plan view of a negative pressure type head slider 26D according to a fifth preferred embodiment of the present invention. FIG. 11 is a partially cutaway perspective view of the head slider 26D shown in FIG. 10. The head slider 26D has an air inlet end 26a and an air outlet end 26b. The upper surface of the head slider 26D as viewed in FIGS. 10 and 11 is a disk opposing surface adapted to face the corresponding disk 6. A pair of rails 92 and 94 for generating a positive pressure are formed on the disk opposing surface of the head slider 26D. The rails 92 and 94 have flat air bearing surfaces 92a and 94a for generating a flying force during rotation of the disk 6, respectively.

The rails 92 and 94 are formed with tapering surfaces 92b and 94b adjacent to the air inlet end 26a, respectively. A center rail 104 is formed between the rails 92 and 94 near the air inlet end 26a. The center rail 104 also has a tapering surface 104b adjacent to the air inlet end 26a. A slit 106 is defined between the rail 92 and the center rail 104, and a slit 108 is defined between the rail 94 and the center rail 104. A first groove 110 for generating a negative pressure by expanding the air once compressed near the air inlet end 26a is defined between the rails 92 and 94 on the downstream side of the center rail 104. An electromagnetic transducer 62 is formed near the air outlet end of the rail 92. The rail 92 has a relatively large width near the air inlet end and near the air outlet end and has a relatively small width at an intermediate portion therebetween. Similarly, the rail 94 has a relatively large width near the air inlet end and near the air outlet end and has a relatively small width at an intermediate portion therebetween. By setting the widths of the rails 92 and 94 as mentioned above, fluctuations in flying attitude of the head slider 26D due to changes in yaw angle can be suppressed.

A pair of projections 96 and 98 for preventing the stiction of the head slider 26D upon CSS are formed on the rail 92. Similarly, a pair of projections 100 and 102 for prevention of the stiction are formed on the rail 94. Further, a plurality of narrow second grooves 112 are formed on the bottom surface of the first groove 110 so as to continuously extend from the air inlet side to the air outlet end 26b. The second grooves 112 are spaced from each other in the transverse direction of the head slider 26D. The second grooves 112 extend along different streamlines 113 of air generated on the bottom surface of the first groove 110. Preferably, the second grooves 112 extend along such air streamlines generated on the bottom surface of the first groove 110 in the CSS zone.

By forming these narrow grooves 112 on the bottom surface of the first groove 110, dust or dirt deposited on the bottom surface of the first groove 110 during the entry of air into the first groove 110 can be guided along the second grooves 112 to the air outlet end 26b, thereby suppressing the accumulation of the dust or dirt on the bottom surface of the first groove 110.

Figure 12:
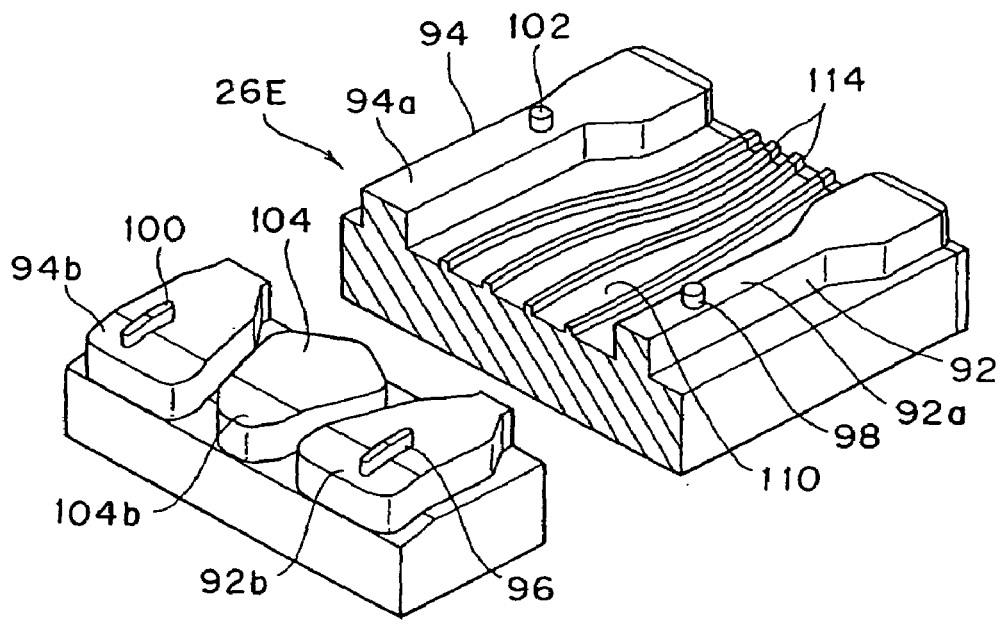
FIG. 12 is a partially cutaway perspective view of a negative pressure type head slider according to a sixth preferred embodiment of the present invention.

Referring to FIG. 12, there is shown a partially cutaway perspective view of a negative pressure type head slider 26E according to a sixth preferred embodiment of the present invention. The head slider 26E according to the sixth preferred embodiment has a plurality of rails 114 in place of the second grooves 112 in the fifth preferred embodiment shown in FIGS. 10 and 11. The other configuration of the sixth preferred embodiment is similar to that of the fifth preferred embodiment shown in FIGS. 10 and 11. According to the sixth preferred embodiment, dust or dirt deposited on the bottom surface of the groove 110 during the entry of air into the groove 110 can be guided along the rails 114 to the air outlet end 26b, thereby preventing the accumulation of the dust or dirt on the bottom surface of the groove 110.

Figure 13:
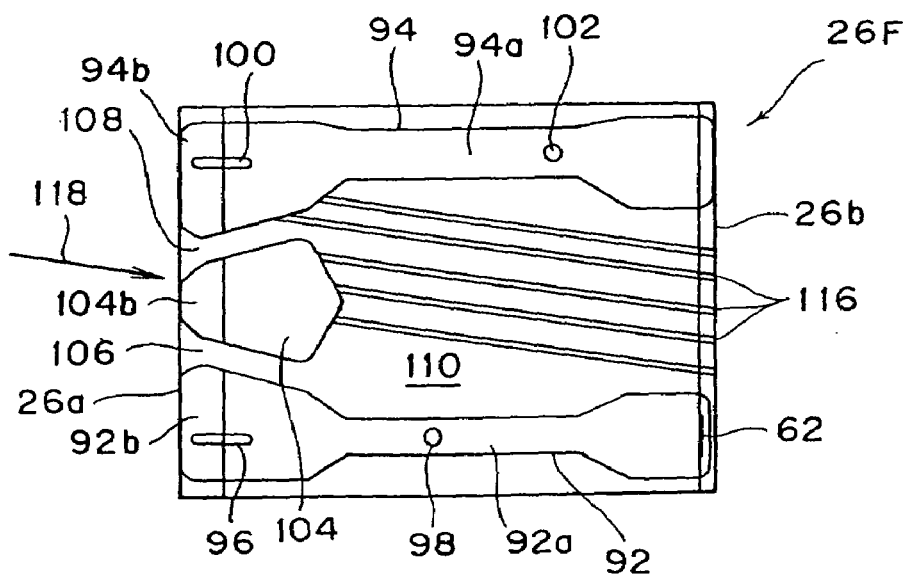
FIG. 13 is a plan view of a negative pressure type head slider according to a seventh preferred embodiment of the present invention.

Referring to FIG. 13, there is shown a plan view of a negative pressure type head slider 26F according to a seventh preferred embodiment of the present invention. The head slider 26F according to the seventh preferred embodiment has a plurality of second grooves 116 extending in a direction substantially parallel to an air inlet direction shown by arrow 18 in the CSS zone. The second grooves 116 are formed on the bottom surface of the first groove 110. Like the head slider 26B according to the third preferred embodiment shown in FIG. 7, the head slider 26F has a great effect of removing the dust or dirt especially in the CSS zone. The other configuration of this preferred embodiment is similar to that of the fifth preferred embodiment shown in FIGS. 10 and 11.

Figure 14:
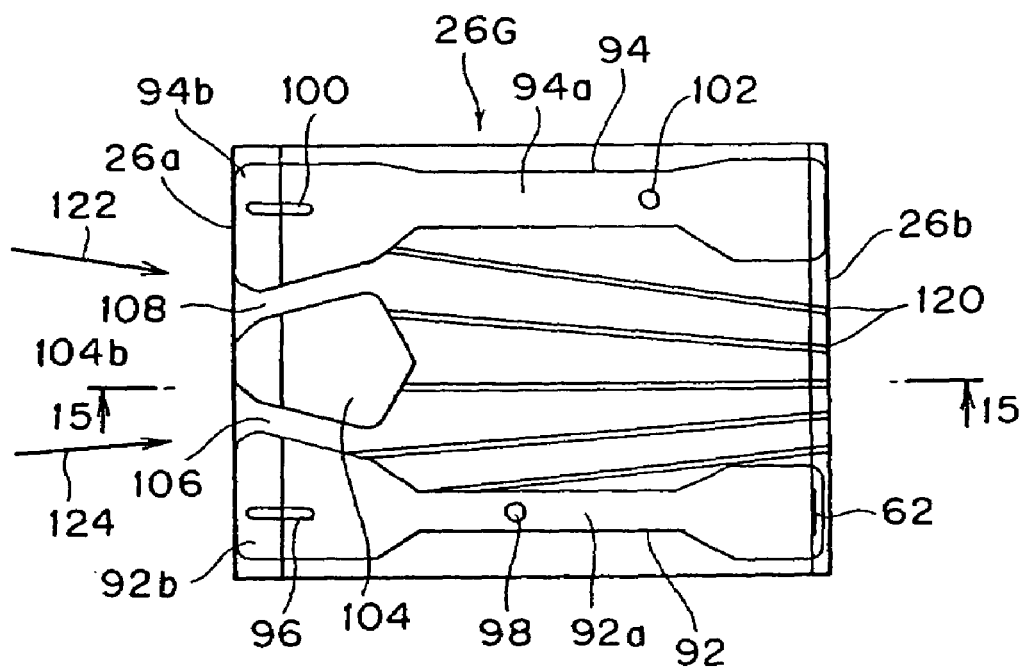
FIG. 14 is a plan view of a negative pressure type head slider according to an eighth preferred embodiment of the present invention.
Figure 15:
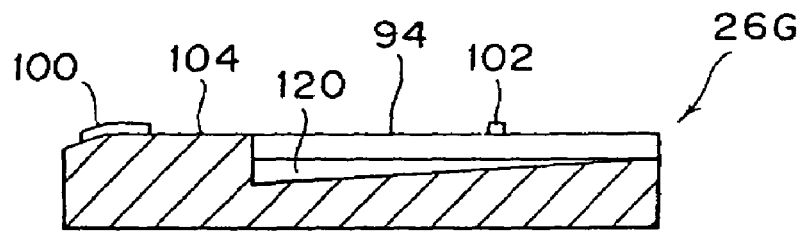
FIG. 15 is a cross section taken along the line 15—15 in FIG. 14.

Referring to FIG. 14, there is shown a plan view of a negative pressure type head slider 26G according to an eighth preferred embodiment of the present invention. FIG. 5 is a cross section taken along the line 15—15 in FIG. 14. The head slider 26G according to the eighth preferred embodiment has a plurality of second grooves 120 extending in different directions in the first groove 110. That is, the angle of extension of the second grooves 120 with respect to the longitudinal direction of the head slider 26G is continuously changed in such a manner that the direction of extension of the innermost groove 120 is substantially parallel to an air inlet direction shown by arrow 122 in the innermost track condition and the direction of extension of the outermost groove 120 is substantially parallel to an air inlet direction shown by arrow 124 in the outermost track condition. Furthermore, as shown in FIG. 15, the depth of each second groove 120 is continuously decreased from the air inlet side to the air outlet end 26b. Alternatively, the depth of each second groove 120 may be stepwise decreased toward the air inlet end 26b. Further, also in the fifth and seventh preferred embodiments, the depths of the second grooves 112 and 116 may be continuously or stepwise decreased from the air inlet side to the air outlet end 26b.

Figure 16A:
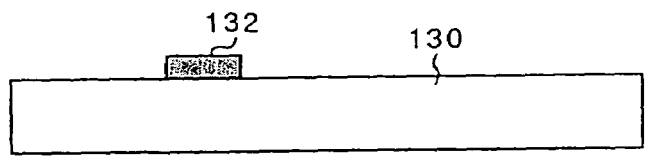
FIGS. 16A to 16I are schematic views showing a manufacturing method for the head slider according to the first preferred embodiment.
Figure 16B:
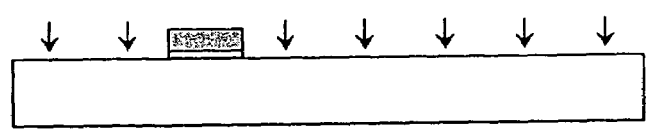
Figure 16C:
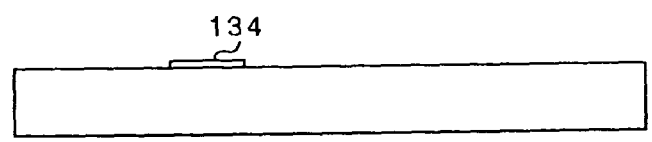

A manufacturing method for the head slider 26 according to the first preferred embodiment will now be described with reference to FIGS. 16A to 16I. This manufacturing method is a method to which a second groove forming process is added after conventional processes. As shown in FIG. 16A, a photoresist 132 is first applied to the upper surface of a slider substrate 130 at a position where the air bearing surface is to be formed. As shown in FIG. 16B, the upper surface of the slider substrate 130 is next etched by the difference in level between the air bearing surface (raised surface) and the step surface by ion beam etching mainly using Ar gas. Further, the photoresist 132 is next removed (FIG. 16C). In this condition, the air bearing surface 134 is formed.

Figure 16D:
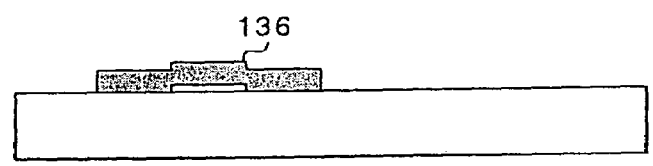
Figure 16E:
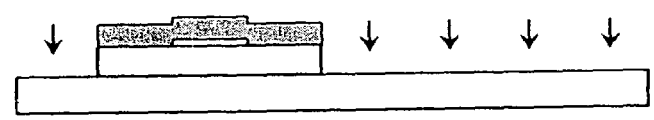
Figure 16F:
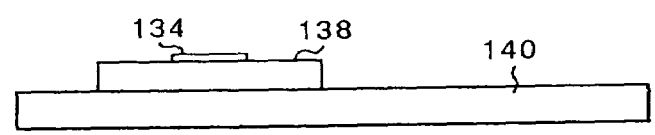

As shown in FIG. 16D, a photoresist 136 is next applied to the air bearing surface 134 and the upper surface of the slider substrate 130 at a position where the step surface is to be formed. As shown in FIG. 16E, the upper surface of the slider substrate 130 is next etched by a predetermined thickness by ion beam etching. Further, the photoresist 136 is next removed (FIG. 16F). In this condition, the step surface 138 and the first groove 140 are formed.

Figure 16G:
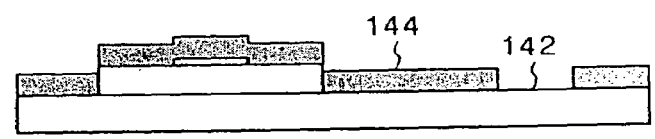
Figure 16H:
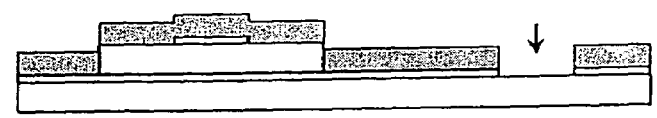
Figure 16I:
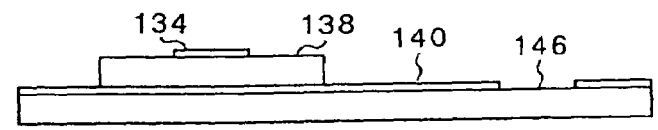

As shown in FIG. 16G, a photoresist 144 is next applied to the air bearing surface 134, the step surface 138, and the upper surface of the slider substrate 130 except a position 142 where the second grooves are to be formed. As shown in FIG. 16H, the upper surface of the slider substrate 130 is next etched by a predetermined thickness by ion beam etching. Further, the photoresist 144 is next removed (FIG. 16I). Thus, the second grooves 146 (one of which being shown) are formed.

Referring to FIGS. 17A to 17F, there is shown another manufacturing method for the head slider 26. In this method, the step surface and the second grooves are simultaneously formed. As shown in FIG. 17A, a photoresist 152 is first applied to the upper surface of the slider substrate 130 except a position 148 where the step surface is to be formed and a position 150 where the second grooves are to be formed. As shown in FIG. 17B, the upper surface of the slider substrate 130 is next etched by a predetermined thickness by ion beam etching. Further, the photoresist 152 is next removed (FIG. 17C). In this condition, the air bearing surface 154 is formed.

As shown in FIG. 17D, a photoresist 156 is next applied to the air bearing surface 154 and the upper surface of the slider substrate 130 at the position where the step surface is to be formed. As shown in FIG. 17E, the upper surface of the slider substrate 130 is next etched by a predetermined thickness by ion beam etching. Further, the photoresist 156 is next removed (FIG. 17F). Thus, the step surface 158, the first groove 160, and the second grooves 162 (one of which being shown) are formed. According to this method, the manufacturing process can be shortened by three steps as compared with the manufacturing method shown in FIGS. 16A to 16I.

A manufacturing method for the head slider 26A according to the second preferred embodiment shown in FIG. 6 will now be described with reference to FIGS. 18A to 18I. As shown in FIG. 18A, a photoresist 164 is first applied to the upper surface of the slider substrate 130 at a position where the air bearing surface (raised surface) is to be formed. As shown in FIG. 18B, the upper surface of the slider substrate 130 is next etched by a predetermined thickness by ion beam etching. Further, the photoresist 164 is next removed (FIG. 18C). In this condition, the air bearing surface 166 is formed.

As shown in FIG. 18D, a photoresist 168 is next applied to the air bearing surface 166 and the upper surface of the slider substrate 130 at a position where the step surface is to be formed. As shown in FIG. 18E, the upper surface of the slider substrate 130 is next etched by a predetermined thickness by ion beam etching. Further, the photoresist 168 is next removed (FIG. 18F). In this condition, the step surface 170 is formed.

As shown in FIG. 18G, a photoresist 174 is next applied to the air bearing surface 166, the step surface 170, and the upper surface of the slider substrate 130 at a position where the rails are to be formed. As shown in FIG. 18H, the upper surface of the slider substrate 130 is next etched by a predetermined thickness by ion beam etching. Further, the photoresist 174 is next removed (FIG. 18I). Thus, the groove 172 and the rails 176 (one of which being shown) are formed.

Figure 19A:
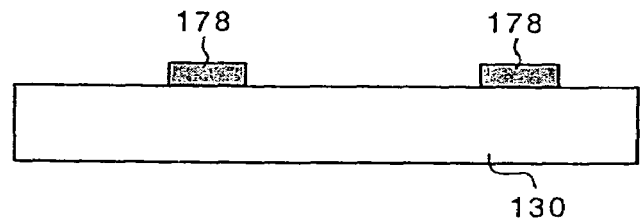
FIGS. 19A to 19F are schematic views showing another manufacturing method for the head slider according to the second preferred embodiment.
Figure 19B:
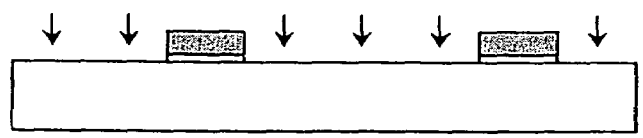
Figure 19C:
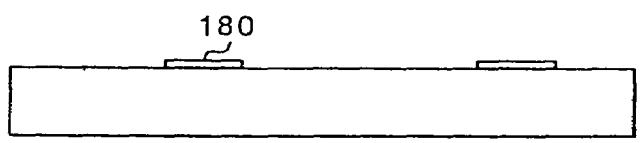

Another manufacturing method for the head slider 26A according to the second preferred embodiment will now be described with reference to FIGS. 19A to 19F. In this method, the step surface and the rails are simultaneously formed. As shown in FIG. 19A, a photoresist 178 is first applied to the upper surface of the slider substrate 130 at positions where the air bearing surface and the rails are to be formed. As shown in FIG. 19B, the upper surface of the slider substrate 130 is next etched by a predetermined thickness by ion beam etching. Further, the photoresist 178 is next removed (FIG. 19C). In this condition, the air bearing surface 180 is formed.

Figure 19D:
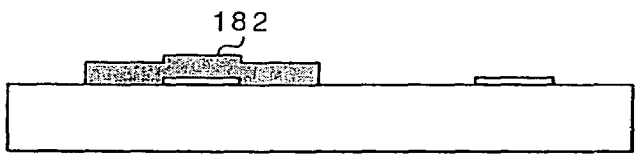
Figure 19E:
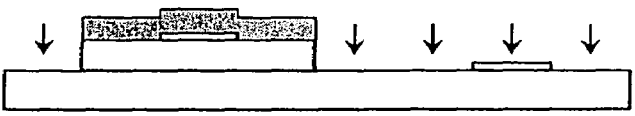
Figure 19F:
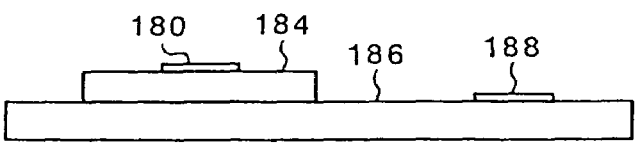

As shown in FIG. 19D, a photoresist 182 is next applied to the air bearing surface 180 and the upper surface of the slider substrate 130 at a position where the step surface is to be formed. As shown in FIG. 19E, the upper surface of the slider substrate 130 is next etched by a predetermined thickness by ion beam etching. Further, the photoresist 182 is next removed (FIG. 19F). Thus, the step surface 184, the groove 186, and the rails 188 (one of which being shown) are formed. According to this method, the manufacturing process can be shortened by three steps as compared with the manufacturing method shown in FIGS. 18A to 18I.

In the negative pressure type head slider according to the present invention, the plural narrow grooves or rails are formed on the bottom surface of the groove for generating a negative pressure. These narrow grooves or rails extend along the air streamlines in the CSS zone or substantially parallel to an air inlet direction in the CSS zone. Alternatively, the angle of extension of these narrow grooves or rails with respect to the longitudinal direction of the head slider may be continuously changed so that the direction of extension of the innermost groove is substantially parallel to an air inlet direction in the innermost track condition and the direction of extension of the outermost groove is substantially parallel to an air inlet direction in the outermost track condition.

By the formation of the plural narrow grooves or rails on the bottom surface of the groove for generating a negative pressure, dust or dirt deposited on the bottom surface of the negative pressure generating groove during the entry of air into this groove can be guided along these narrow grooves or rails to an air outlet end to thereby prevent the accumulation of the dust or dirt on the bottom surface of the negative pressure generating groove. As a result, the dust or dirt deposited on the bottom surface of the negative pressure generating groove can be prevented from falling down onto the disk, thereby preventing head crash due to the dust or dirt.

What is claimed is:

1. A disk drive comprising:
a housing having a base;
a disk rotatably mounted in said housing, said disk having a plurality of tracks and a CSS zone at an inner portion thereof;
a negative pressure type head slider having a transducer for reading/writing data from/to said disk, a disk opposing surface, an air inlet end, and an air outlet end; and
an actuator for moving said head slider across said tracks of said disk;
said actuator including:
an actuator arm rotatably mounted on said base;
a suspension fixed at a base end portion thereof to a front end portion of said actuator arm; and
said head slider mounted on a front end portion of said suspension;
said head slider including:
said transducer formed near said air outlet end;
a groove for generating a negative pressure by expanding air once compressed;
several side rails formed at a first height less than said first height relative to a bottom surface of said groove; and
a plurality of rails formed on the bottom surface of said groove at a second height relative to the bottom surface of said groove, said plurality of rails being between said side rails so as to continuously extend from near said air inlet end to said air outlet end, said rails being spaced from each other in the transverse direction of said head slider, and extending along air streamlines generated on the bottom surface of said groove in the CSS zone.

2. A disk drive according to claim 1, further comprising a front pad formed on said disk opposing surface at a position near said air inlet end, said front pad having a raised surface and a step surface lower in level than said raised surface;
wherein said plurality of rails continuously extend from the downstream side of said front pad to said air outlet end.

3. A disk drive according to claim 1, further comprising a pair of second rails formed on said disk opposing surface, each of said second rails having a flat air bearing surface for generating a flying force during rotation of said disk;
wherein said groove is defined between said pair of second rails.

4. A negative pressure type head slider for a disk drive having a disk rotatably mounted therein, said disk having a CSS zone at an inner portion thereof, said head slider having a disk opposing surface, an air inlet end, and an air outlet end, the head slider comprising:
a transducer formed near said air outlet end;

a groove for generating a negative pressure by expanding air once compressed;

a plurality of side rails formed at a first height relative to a bottom surface of said groove; and several rails formed on the bottom surface of said groove at a second height less than said first height relative to the bottom surface of said groove, said plurality of rails being between said side rails so as to continuously extend from near said air inlet end to said air outlet end, said rails being spaced from each other in the transverse direction of said head slider, and extending along air streamlines generated on the bottom surface of said groove in the CSS zone.

5. A negative pressure type head slider according to claim 4, further comprising a front pad formed on said disk opposing surface at a position near said air inlet end, said front pad having a raised surface and a step surface lower in level than said raised surface;

wherein said plurality of rails continuously extend from the downstream side of said front pad to said air outlet end.

6. A negative pressure type head slider according to claim 4, further comprising a pair of second rails formed on said disk opposing surface, each of said second rails having a flat air bearing surface for generating a flying force during rotation of said disk;

wherein said groove is defined between said pair of second rails.

* * * * *